(12) United States Patent
Patel et al.

(10) Patent No.: US 10,076,895 B2
(45) Date of Patent: Sep. 18, 2018

(54) AIRCRAFT INTERIOR PANELS AND METHODS OF PANEL FABRICATION

(71) Applicant: The Boeing Company, Chicago, IL (US)

(72) Inventors: Jayant Dahyabhai Patel, Lake Forest, CA (US); John N. Harris, Seattle, WA (US); Sergio H. Sanchez, Renton, WA (US); James A. Fullerton, Bothell, WA (US)

(73) Assignee: The Boeing Company, Chicago, IL (US)

( * ) Notice: Subject to any disclaimer, the term of this patent is extended or adjusted under 35 U.S.C. 154(b) by 617 days.

(21) Appl. No.: 14/638,952

(22) Filed: Mar. 4, 2015

(65) Prior Publication Data
US 2015/0174874 A1    Jun. 25, 2015

Related U.S. Application Data

(62) Division of application No. 13/295,481, filed on Nov. 14, 2011, now Pat. No. 9,005,730.

(51) Int. Cl.
*B29C 44/14*    (2006.01)
*B29C 51/10*    (2006.01)
(Continued)

(52) U.S. Cl.
CPC .............. *B32B 37/02* (2013.01); *B29C 43/18* (2013.01); *B29C 43/206* (2013.01); *B29C 43/56* (2013.01);
(Continued)

(58) Field of Classification Search
CPC ..... B29C 44/12; B29C 44/1266; B29C 44/14; B29C 44/146; B29C 44/42; B29C 44/44;
(Continued)

(56) References Cited

U.S. PATENT DOCUMENTS 3,791,912 A * 2/1974 Allard .................... B29C 70/00
                                                           428/114
4,038,447 A   7/1977 Brock
(Continued)

FOREIGN PATENT DOCUMENTS

| EP | 1504889 A2 | 2/2005 |
| EP | 1510747 A1 | 2/2005 |
| WO | 97/27048 A1 | 7/1997 |

OTHER PUBLICATIONS

Patel, "Self-Configurating Hybrid Duct System & Attachment Technologies for Environmental Control System." SAE Int'l J. of Aerospace, vol. 2, No. 1, 275-283 (Mar. 2010).
(Continued)

*Primary Examiner* — Michael A Tolin
(74) *Attorney, Agent, or Firm* — Ostrager Chong Flaherty & Broitman P. C.

(57) ABSTRACT

A multifunctional fully integral panel system design, a unique material configuration, and a process for fabricating a net shape (or nearly net shape) panel in one production cycle. The panel may comprise a base facing with an outer perimeter, a decorative film applied to the exterior of the base facing, an aft facing having an outer perimeter fused to the base facing, and a reinforcement core disposed between the unfused portions of the base and aft facings, which reinforcement core also acts as acoustic insulation (i.e., a noise attenuator). Alternatively or additionally, a foam core or blanket having thermal and/or acoustic insulation properties is attached to the external surface of the aft facing. The fabrication process involves the application of different heat treatments to panel components having different forming temperature or rubbery/elastic plateaus.

10 Claims, 4 Drawing Sheets

(51) Int. Cl.
| | |
|---|---|
| B29C 51/12 | (2006.01) |
| B29C 65/08 | (2006.01) |
| B29C 65/16 | (2006.01) |
| B32B 5/20 | (2006.01) |
| B32B 37/02 | (2006.01) |
| B32B 37/10 | (2006.01) |
| B29C 70/08 | (2006.01) |
| B29C 69/00 | (2006.01) |
| B29D 99/00 | (2010.01) |
| B64C 1/06 | (2006.01) |
| B29C 43/18 | (2006.01) |
| B29C 43/20 | (2006.01) |
| B29C 43/56 | (2006.01) |
| B32B 37/06 | (2006.01) |
| B32B 37/18 | (2006.01) |
| B32B 37/24 | (2006.01) |
| B32B 38/00 | (2006.01) |
| B29C 51/26 | (2006.01) |
| B29K 101/12 | (2006.01) |
| B29K 105/04 | (2006.01) |
| B29L 9/00 | (2006.01) |
| B29L 31/30 | (2006.01) |

(52) U.S. Cl.
CPC ............ *B29C 44/146* (2013.01); *B29C 51/12* (2013.01); *B29C 65/08* (2013.01); *B29C 65/16* (2013.01); *B29C 69/004* (2013.01); *B29C 70/086* (2013.01); *B29D 99/0021* (2013.01); *B32B 5/20* (2013.01); *B32B 37/06* (2013.01); *B32B 37/18* (2013.01); *B32B 37/24* (2013.01); *B32B 38/0036* (2013.01); *B64C 1/066* (2013.01); *B29C 51/10* (2013.01); *B29C 51/105* (2013.01); *B29C 51/267* (2013.01); *B29C 2043/189* (2013.01); *B29C 2043/561* (2013.01); *B29C 2791/006* (2013.01); *B29K 2101/12* (2013.01); *B29K 2105/04* (2013.01); *B29L 2009/00* (2013.01); *B29L 2031/3005* (2013.01); *B29L 2031/3076* (2013.01); *B32B 2038/0084* (2013.01); *B32B 2305/022* (2013.01); *B32B 2305/024* (2013.01); *B32B 2305/08* (2013.01); *B32B 2307/102* (2013.01); *B32B 2307/304* (2013.01); *B32B 2310/028* (2013.01); *B32B 2310/0843* (2013.01); *B32B 2451/00* (2013.01); *B32B 2605/18* (2013.01); *B32B 2607/00* (2013.01); *Y02T 50/46* (2013.01); *Y10T 156/1002* (2015.01); *Y10T 156/1031* (2015.01); *Y10T 428/23* (2015.01); *Y10T 428/233* (2015.01); *Y10T 428/24149* (2015.01); *Y10T 428/24744* (2015.01); *Y10T 428/249924* (2015.04); *Y10T 428/249953* (2015.04); *Y10T 428/249976* (2015.04); *Y10T 428/31504* (2015.04)

(58) Field of Classification Search
CPC ..... B29C 51/002; B29C 51/10; B29C 51/105; B29C 51/12; B29C 51/267; B29C 65/08; B29C 65/16; B29C 66/727; B29C 69/004; B29C 70/086; B29C 70/84; B29C 2791/006; B29D 99/0021; B29L 2031/3005; B29L 2031/3076; B29K 2105/04; B32B 3/12; B32B 5/18; B32B 5/20; B32B 27/065; B32B 27/12; B32B 37/02; B32B 37/06; B32B 37/1018; B32B 37/24; B32B 2038/0084; B32B 2305/022; B32B 2305/024; B32B 2305/08; B32B 2307/102; B32B 2307/304; B32B 2605/18; B32B 2607/00; B64C 1/066; B64C 1/40; Y02T 50/46; Y02T 50/47
See application file for complete search history.

(56) References Cited

U.S. PATENT DOCUMENTS

| | | | | |
|---|---|---|---|---|
| 4,668,567 | A | * | 5/1987 | Williams ............... B29C 44/146 220/592.25 |
| 4,917,747 | A | * | 4/1990 | Chin ....................... B29C 53/04 156/198 |
| 5,000,805 | A | | 3/1991 | Lowe |
| 5,389,847 | A | | 2/1995 | Nakamura et al. |
| 5,431,990 | A | | 7/1995 | Haynes et al. |
| 5,788,184 | A | | 8/1998 | Eddy |
| 6,000,435 | A | | 12/1999 | Patel et al. |
| 6,287,678 | B1 | * | 9/2001 | Spengler ............... B29C 44/569 156/228 |
| 6,712,316 | B2 | | 3/2004 | Jones |
| 6,811,192 | B2 | | 11/2004 | Patel et al. |
| 6,828,001 | B2 | | 12/2004 | Tokonabe et al. |
| 6,830,076 | B1 | | 12/2004 | Patel |
| 7,118,069 | B2 | | 10/2006 | Novak et al. |
| 7,157,034 | B2 | | 1/2007 | Bristow et al. |
| 7,371,451 | B2 | | 5/2008 | Messinger |
| 7,665,982 | B2 | | 2/2010 | Lucier et al. |
| 2005/0005544 | A1 | | 1/2005 | Borowiecki et al. |
| 2005/0175809 | A1 | | 8/2005 | Hirai et al. |
| 2009/0166127 | A1 | * | 7/2009 | Thomas .................... B64C 1/40 181/292 |
| 2009/0173571 | A1 | * | 7/2009 | Keller ..................... B64C 1/066 181/292 |
| 2010/0044149 | A1 | | 2/2010 | Patel et al. |
| 2011/0108667 | A1 | * | 5/2011 | Keller ................... B29C 51/082 244/119 |

OTHER PUBLICATIONS

Extended European Search Report in European Application No. 12192182.9 (European counterpart of the parent application of the instant application) dated Nov. 7, 2016.

European Examination Report dated Oct. 11, 2017 in European Application No. 12192182.9 (European counterpart of the parent application of the instant application).

European Examination Report dated May 16, 2018 in European Application No. 12192182.9 (European counterpart of the parent application of the instant divisional application).

* cited by examiner

AIRCRAFT INTERIOR PANELS AND METHODS OF PANEL FABRICATION

RELATED PATENT APPLICATION

This application is a divisional of and claims priority from U.S. patent application Ser. No. 13/295,481 filed on Nov. 14, 2011, which issued as U.S. Pat. No. 9,005,730 on Apr. 14, 2015.

BACKGROUND

This disclosure generally relates to techniques for forming plastic products and in particular, relates to techniques for fabricating interior panels for aircraft.

Vacuum forming is a thermoforming process that enables molding a heated and softened sheet of thermoplastic material by applying vacuum suction through a perforated/vented mold. The suction makes the sheet stretch and drape over the mold surface to take the form of the mold shape. The sheet is then cooled down to solidify and retain the shape of the mold. Sometimes the cooling is aided using blown cooling air.

Twin-sheet vacuum thermoforming is a thermoforming process that refers to the molding of a first sheet in an upper mold and a second sheet in a lower mold, followed by an operation of compression of the two formed sheets against each other while still hot and relatively soft, thereby providing a fused interface to produce a hollow type product.

Although twin-sheet vacuum thermoforming has been successfully used for decades to manufacture hollow products such as gas tanks, ducts, pallets, and water craft, for example, it has been found desirable to further provide products with inserts to improve the structure and/or certain properties of the product. An insert can be defined as a body that is not subjected to molding and which has to be inserted between the molded sheets and generally within a cavity created inside the thermoformed hollow product.

The fabrication of molded aircraft components from thermoset composite materials is well known in the art. However, the current materials and fabrication methods for fabricating sidewall and ceiling panels for aircraft suffer from very long fabrication cycle-time, material waste and disposal cost, and involve numerous processing cycles with individually fabricated components converted to sub-assembles and manually assembled at a significant cost and weight that retain product deficiencies and waste. The current process also requires multiple complex tools and equipment, which require long lead times, storage facilities and infrastructure. Custom treatments of composite panels are also required to address thermal and noise generated by airflow, equipment and other systems. The current processes do not allow for the integration of new decorative texture uniformity that is required by complex design configurations. The current process is also not tool-side controlled, which affords part-to-part variability and requires repairs.

Existing composite constructions often contain multiple materials that exhibit only a small difference in their thermal properties. However, the processing methods that utilize a uniform temperature field to fabricate these existing composite configurations are not optimal for many new materials or material configurations that exhibit highly variable thermal properties. While production of composite structures using these new materials may still be feasible using a multiple-stage processing method, it is also inefficient in both time and energy. Single-stage processing is preferred for its efficiency.

Current conventional tooling and fabrication methods also lack the capability to fabricate net size parts. This results in excessive material trim-off from the part periphery and internal cut-outs. In addition to material waste, the added steps of cutting induces residual stresses and embrittlement that can adversely affect the service life of the component. Thus, a net shape part that does not require tools to remove waste material from the part will be a significant benefit.

There is a need for panel fabrication processes that avoid the above-stated disadvantages and impart additional improvements.

SUMMARY

A multifunctional fully integral aircraft interior panel system, a unique material configuration, and a process for fabricating a net shape (or nearly net shape) panel in one production cycle are disclosed herein. The panel may comprise a base facing having an outer perimeter, a decorative film applied to the exterior of the base facing, and an aft facing having an outer perimeter fused to the base facing to define an interior volume. The panel may further comprise a reinforcement core disposed between the unfused portions of the base and aft facings. Such reinforcement core may also provide acoustic insulation (i.e., a noise attenuator). Alternatively or additionally, a closed or open cell (or combination thereof) foam core or a fibrous blanket having thermal and/or acoustic insulation properties is attached to the external surface of the aft facing.

In accordance with one embodiment, a panel for an aircraft interior comprises base and aft facings fused together along a perimeter defining an interior volume between the two facings. The base facing may comprise a thermoplastic sheet or a sheet of composite material having a fiber layer encapsulated in a polymer matrix. The panel may further comprise a reinforcement core disposed between the two facings. The core may further comprise polymer rods embedded in the core and/or bonded to a facing. The reinforcement core may comprise insulation material.

According to another embodiment, a method for manufacturing a panel for an aircraft interior comprises: bonding a plurality of polymer rods to one surface of a base facing; placing another surface of the base facing against a first tool having a shape defining one surface of an aircraft interior panel having a window; placing a surface of an aft facing against a second tool having a shape defining another surface of the aircraft interior panel having a window; placing an insulation layer adjacent to one surface of the base facing; vacuum forming the base and aft facings to take the respective shapes of the first and second tools; and pressing the base and aft facings together such that they contact each other and fuse along a perimeter to form the aircraft interior panel with the insulation layer and polymer rods inside.

According to a further embodiment, a method for manufacturing a panel for an aircraft interior comprises: placing a surface of the base facing against a first tool having a shape defining one surface of an aircraft interior panel having a window; placing a surface of an aft facing against a second tool having a shape defining another surface of the aircraft interior panel having a window; vacuum forming the base and aft facings to take the respective shapes of the first and second tools; pressing the base and aft facings together such that they contact each other and fuse along a perimeter; and bonding an insulation layer to an exterior surface of one of the base and aft facings.

Other aspects are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
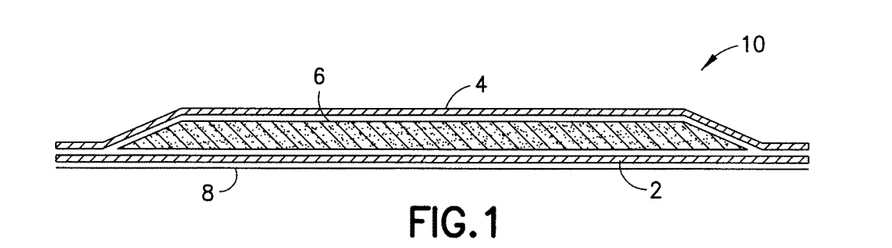
FIG. 1 is a diagram showing an exploded cross-sectional view of a panel having a sandwiched core in accordance with certain embodiments.
Figure 2:
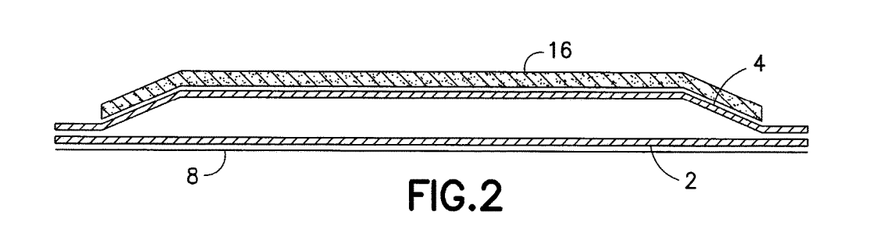
FIG. 2 is a diagram showing an exploded cross-sectional view of a panel having insulation attached to an exterior surface of an aft facing in accordance with other embodiments.

A cross section of an aircraft interior panel 10 is shown in FIGS. 1 and 2. The interior aircraft panel may have a pair of sheets commonly known as facings 2 and 4, separated by a distance and fused at a perimeter of each facing to define an interior volume. The interior volume may be void (as shown in FIG. 2) or may have a reinforcement core 6 to enhance properties such as noise attenuation, thermal insulation or structural rigidity.

The facings comprise base facing 2 and aft facing 4 that are vacuum formed and fused together along a perimeter. The fused facing sheets are cooled to form a solidified net shape panel having no excessive material to be trimmed off. Each facing may be a polymer sheet such as a thermoplastic polymer or a composite sheet comprising a layer of reinforcement fibers embedded or encapsulated in a polymer matrix. Examples of reinforcement fibers include glass, carbon or Kevlar fibers coated with a thermoplastic matrix material. The base facing may comprise a fine weaved fabric that is impregnated with a thermoplastic/polymeric material. The aft facing, on the other hand, may comprise an open weave (such as a Leno weave) fabric that is also impregnated with a thermoplastic/polymeric material. The aft facing may also have a plurality of small holes extending from an exterior surface to the inner void between the two facings. This feature allows for reduced weight and improved noise attenuation. In some embodiments, the aft facing is optional and can be eliminated to reduce weight and material costs.

The reinforcement core 6 is a material disposed between the two facings 2, and 4 to improve certain panel properties such as acoustic attenuation, thermal insulation and/or strength to support compressive fastening loads and provide increased stiffness. The core may be a honeycomb core (for strength), an open-cell or closed-cell foam for acoustic and/or thermal insulation, or a fibrous mat for acoustic and/or thermal insulation or a combination thereof (e.g., a combination of foam core and honeycomb core). Alternatively or additionally, a closed-cell or open-cell (or combination thereof) foam core or a fibrous mat having thermal and/or acoustic insulation properties may be attached to the external surface of the aft facing.

Figure 3:
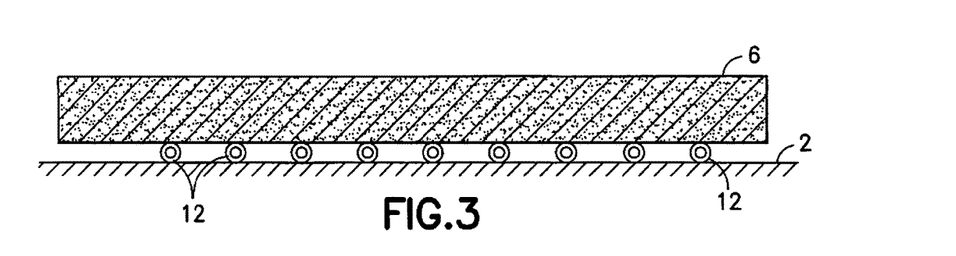
FIG. 3 is a diagram showing a cross-sectional view of an initial hollow helix and foam lay-up in accordance with one fabrication process.
Figure 4:
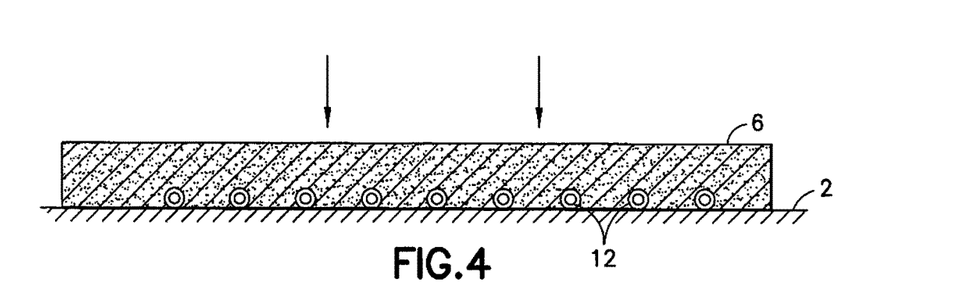
FIG. 4 is a diagram showing a cross-sectional view of polymer rods embedded and fused in foam.

As shown in FIGS. 3 and 4, the core may also include rods 12 to improve noise attenuation. The rods may be solid or hollow in cross-section and composed of polymer, metal, non-metal or various combinations thereof, such as metallic wire covered with plastic. In one embodiment the polymer rods 12 may be fabricated from a thermoplastic material such as polyetherimide, polyphenisulfone or polyarylsulfone. For a further discussion of polymer rods that could be incorporated in the panels, see U.S. Pat. Nos. 6,830,076 and 6,000,435.

In one embodiment, the rods may be bonded to an interior surface of the base facing 2 or aft facing 4 prior to a vacuum forming process. The rods may extend from one inner perimeter (corresponding to a window opening) of the facing to an outer perimeter or may extend only along a portion of the facing surface. There may be a plurality of rods extending in varying directions on the facing surface. In other embodiments the polymer rods or wires may be substantially encapsulated by a foam insulation (FIG. 4). In a further embodiment, the rods may be rigid to impart a compressive load along a surface of an added reinforcement core thereby changing and aiding the acoustic insulation properties of the panel system. The reinforcement core 6 may be attached mechanically in a molding operation or by welding or integrating techniques such as ultrasonic welding, heat sealing, adhesive bonding and solvent bonding.

The diameter of the rods 12 may be selected to tailor the ultimate stiffness and performance of the base facing. In one embodiment the rods may have a diameter between 0.1 and 0.2 inch and may be spaced approximately 1 inch from an adjacent rod. However, noise attenuation characteristics are dependent on the rod density, diameter, and placement such as the pitch (i.e. distance between the rods). Therefore, noise attenuation in a desired controlled frequency range can be obtained by varying rod density, diameter and pitch for example.

The panel facings may be formed of a composite system comprising a fabric material impregnated and reinforced with polymeric resin. Preferred polymeric resins may include but are not limited to the following: polyetherimide, polyphenylene sulfide, polyphenylsulfone (PPSU), polyetherketone (PEK), polyether ether ketone (PEEK), polyetherketone ketone (PEKK) or any other thermoplastic/polymeric material having desired mechanical properties to meet design and regulatory requirements, such as flame resistance, heat release, and smoke density and toxicity. The fabric material options may include Fiberglass ('E' or 'S') and woven fabric comprising fibers made of Kevlar/aramid, carbon, metal or inorganic material, such as titanium dioxide. Fabric weave options may be open weave or close weave. The selection of fabric and binding resin is typically based on weight and cost.

In certain embodiments, the selection of materials for the base or aft facing may be tailored to meet system requirements. In one example the aft facing fabric and matrix may be made of the same materials used for the base facing. Alternatively, the aft facing may be a thinner thermoplastic/polymeric sheet than the base facing. The aft facing fabric may also include a closed weaved fabric and thermoplastic matrix system while the base facing uses an open weave fabric.

The base facing may also provide a suitable surface to integrate decorative film 8 on an exterior side. The decorative film may provide an aesthetically pleasing décor that is photo-stable, washable/cleanable, and abrasion and solvent resistant. The film may be replaced with paints that conform to fabrication and meet regulatory requirements. The decorative film may be any one of numerous films, opaque or transparent, patterned or printable, such as polyvinylfluoride and Polyvinylidenefluoride. A transparent film may be printed from the backside using ultra-violet radiation to protect the film from solvent abrasion and fading. A decorative film material that is compatible with the plastic substrate may be automatically integrated to the base facing during the forming cycle by fusion (heat and pressure). Another option is to install heat-activated adhesive film.

For embodiments that include a reinforcement core 6, the core may be open/closed cell flexible or rigid foam, foaming film (free-rise foam converts to rigid foam; also known as "foaming adhesive"), or fiber-reinforced (e.g., carbon or aramid fibers) plastic/polymeric material, in the form of a perforated honeycomb core. Suitable foaming adhesive films, having the following product designations, are commercially available: REDUX212NA (available from Hexcel Composites); SynSpan 9899 ICF, PL656 and MA562 (available from Henkel Corporation); and FM490A and FM410-1 (available from Cytec Engineered Materials, Inc.). The core may be formed to provide corrugation of the aft facing. The material choices include, but are not limited to, polyetherimide, lofting (made of fiberglass and ULTEM® resin (i.e., amorphous thermoplastic/polymeric polyetherimide resins)), thermoplastic composite board, PPSU, PEEK, PEK, and PEKK. The selection of the core material is typically based on performance, weight and economy.

As will be explained in more detail below, the panel may be hollow (i.e., may not have a core as shown in FIG. 2), in which case a thermal and/or acoustic barrier may be integrated on the outside surface of the aft skin. Instead of fiberglass, carbon, Kevlar, or other fabrics may be utilized for their unique properties.

The panel system may have the basic structure depicted in FIG. 1. The panel may include a base facing 2, an aft facing 4, and a reinforcement core 6. In some embodiments, the base facing sheet, the aft facing sheet and the reinforcing core material have respective openings of equal size and shape for defining a window in the panel. The panel may also include a decorative film 8 attached to the base facing. In one embodiment, a flexible foaming film may be used to form a composite reinforcement core 6. A pliable foaming film may be placed on an inner surface of either the base or aft facing, or both and exposed to proper temperatures to cause the film to convert to a polymer foam and expand into the space between the base and aft facings when exposed to proper temperatures depending on the foaming material selection that will cause the film to convert to foam. The film may expand to over three times its volume and commingles with a compatible base facing resin, causing similar resins and plastic/polymeric surfaces of both interfaces to fuse together. The expandable foam coats the inner surface of the base facing 2 and acts as a seal.

In accordance with a further embodiment, the reinforcement core 6 may comprise a perforated honeycomb structure. This perforated honeycomb core can be made from thermoplastic or composite material (e.g., fiber-reinforced plastic) whose cell wall structure is perforated with holes to reduce weight and improve impact damping. The core cell structure can be crushed up to 5% during the panel fabrication process, which increases bond strength and noise attenuation. Thus, perforated and crushed honeycomb core enhances bond strength, stiffness and acoustic performance.

In accordance with an alternative basic construction shown in FIG. 2, a multi-featured twin-sheet hollow panel with an exterior barrier is provided. This panel comprises a base facing 2 and an aft facing 4, which are twin-sheet thermoformed together without the reinforcement core (shown in FIG. 1) to form a hollow panel. Each of the facings may be either thermoplastic sheet or polymer composite (e.g., fiber-reinforced plastic). After facings 2 and 4 have been thermoformed together along an outer periphery (and optionally also along an inner periphery, e.g., to form a window recess), an insulation layer 16 may be integrated on the exterior of the aft facing 4. The insulation layer 16 may be a soft pliable foam or fibrous batting, a rigid foam, open cell or closed cell foam, a mixture of open cell and closed cell foams, or may be a honeycomb core and foam system. For example, open-cell structures are known to attenuate noise and closed-cell structures are known to provide thermal protection. The combination of both structures can impart both acoustic and thermal enhancements. In addition, the insulation layer 16 may be attached to the back of the hollow panel using ultrasonic or laser welding techniques. In the alternative, a fiberglass or Nomex fibrous insulation batting may be used in place of foam. Fiberglass batting requires a thin film cover to contain it and prevent movement. In one embodiment, a layer or layers of batting material may be positioned over an aft facing and the a thin film may be positioned over the batting and then fused to the facing surface by, for example, ultrasonic welding, thereby not requiring an underlying cover.

While the disclosed embodiments have focused on structures for aircraft interior sidewalls, the materials and processes described herein can be used to manufacture other structures such as ceiling panels, passenger service units, partitions, attendant consoles, galleys, class dividers, coatrooms, environmental control systems and lavatory components.

Figure 5:
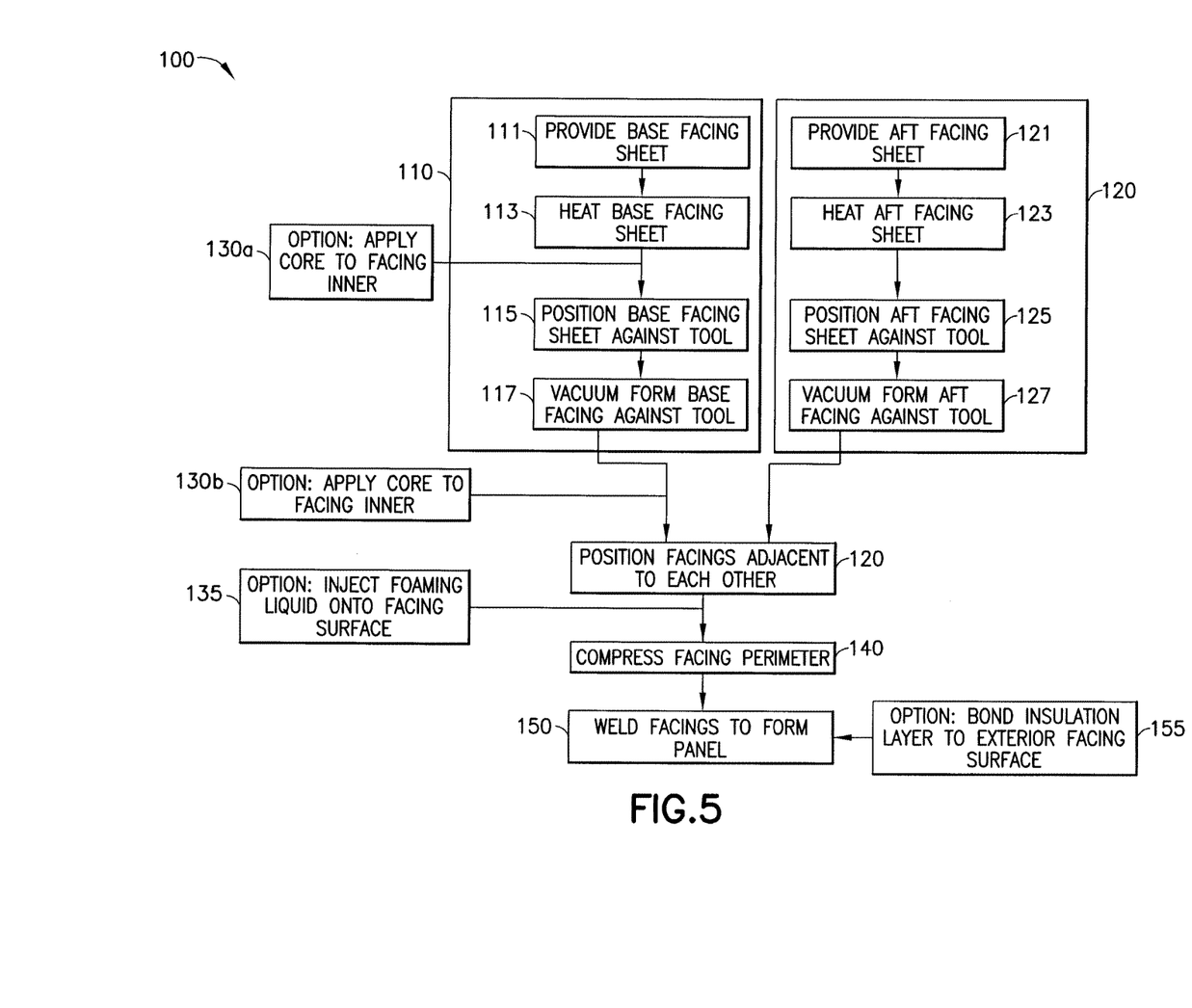
FIG. 5 is a process flow diagram illustrating an embodiment for fabrication of an aircraft panel.

One embodiment of a manufacturing process 100 for making a vacuum-formed aircraft panel as shown in FIG. 5. The process 100 may comprise processing a base facing blank 110, which may include providing the raw base facing sheet 111, heating the sheet 113, positioning the sheet against a tool 115 and vacuum forming 117 the sheet to a desired shape. The process 100 may further comprise processing an aft facing blank 120, which may include providing the raw aft facing sheet 121, heating the sheet 123, positioning the sheet against a tool 125 and vacuum forming 127 the sheet to a desired shape.

The process 100 may further comprise placing a reinforcing core material against an inner surface of the vacuum-formed blank and then heating the combination. The reinforcing core may be positioned either prior to the positioning step 115/125 or after the vacuum forming step 117/127. In example 130a, the reinforcing core may be heated prior to placement against the base facing surface. The core is then placed on top of the heated blank and the blank/core may be heated at the same or a different temperature for a second specified time. After the base facing blank and core have been heated to respective specified temperatures, the base facing/core assembly can then be formed into a desired shape by vacuum molding.

Alternatively, in example 130b, the method comprises placing the reinforcing core onto the facing surface following the vacuum forming step.

Figure 6:
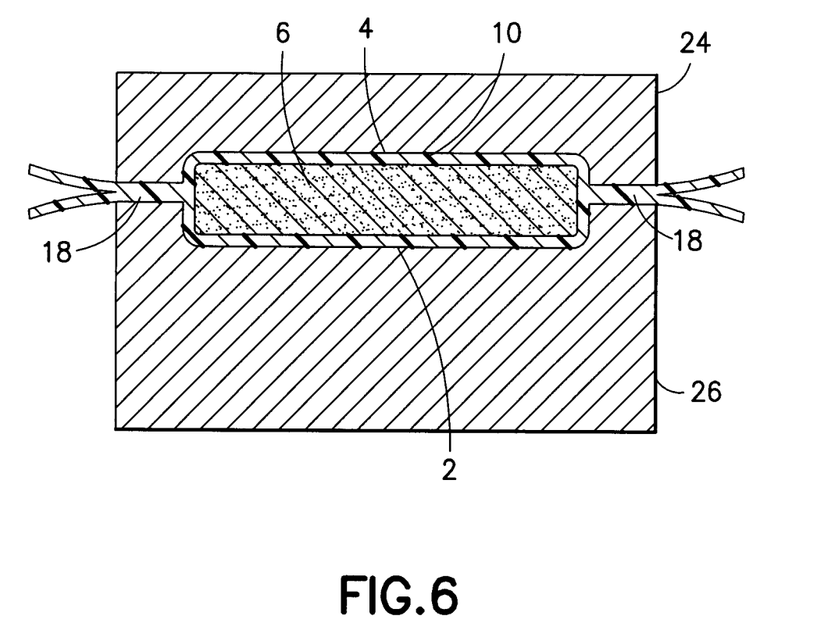
FIG. 6 is a diagram showing a cross-sectional view of two molds forming a vacuum formed facing, positioned to fuse the facings along a perimeter.

After the aft facing and base facings have been formed, the aft and base molds (24 and 26, respectively, shown in FIG. 6) may be aligned and positioned adjacent to each other, compressing the facings along a perimeter 140. In a compression mode, the base and aft facings may be fusion welded 150 together in a peripheral region surrounding the core, thereby forming a panel flange (item 18 in FIG. 6). The process may further include optionally bonding an insulation layer to an aft or base facing surface 155. In the case of an aircraft sidewall, the insulation may be bonded to the aft facing surface and a decorative film layer may be bonded to the base facing surface.

In accordance with an alternative embodiment, a hollow panel system may be formed using the vacuum forming steps described above to form the aft and base facings. The process may further include injection of a foaming liquid 135 during the compression cycle. When appropriate heat is applied, the foaming liquid formation/transformation into foam will occur within the hollow cavity, thereby filling it with foam. The density of the foam and the cell structure (open or closed cell) are determined by the amount of liquid mix injected into the cavity.

The forming temperature or rubbery/elastic plateaus of the base facing material and the core may be dissimilar. Therefore, the base facing material may be subjected to a first heat treatment and the core is subjected to a second heat treatment different than the first heat treatment (e.g., different heating temperatures and times), whereby these materials are heated to their respective forming temperature or rubbery/elastic plateaus.

The raw core material can be rigid foam, flexible foam (stiffening during the forming cycle), or a pliable free-rise film. The core will be sized such that it may be terminated just short of the flange with a portion of the core removed to allow for an acoustical window. The edges may be tapered to allow smoother transition of the facing to prevent concentration of stress and allow gradual movement. The tapering of edges can also be accomplished within the tool/mold during the forming cycle.

In accordance with some embodiments, the aft facing comprises an open fabric weave similar to a screen and is enriched with resin. It is normally used to contain open cell foam and can be used to prevent shedding of loose fibers, such as fiberglass batting.

The base facing is normally solid thermoplastic, thermoplastic/polymer composite or thermoset composite material. The aft facing materials can also be similar to the base facing material, but open weave/leno weave material is preferred due to its aerial weight and porosity for effective control of propagating sound waves.

In accordance with some embodiments, the panel assembly process may further comprise using a tool having mold features that enable panel cutouts (e.g. window reveal recess, or vent access).

While aircraft interior panels and their methods of manufacture have been described with reference to various embodiments, it will be understood by those skilled in the art that various changes may be made and equivalents may be substituted for elements thereof. In addition, many modifications may be made to adapt a particular situation to the teachings without departing from the essential scope thereof. Therefore it is intended that the claims not be limited to the particular embodiments disclosed. In addition, the method claims set forth hereinafter should not be construed to require that all steps of the method be performed in the order in which they are recited.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method of making a panel:
   bonding a plurality of polymer rods to one surface of a base facing;
   heating the base facing to a softened state;
   placing the softened base facing in a first tool having a shape defining one surface of a panel with the polymer rods being on a side of the base facing which faces away from the first tool;
   heating an aft facing to a softened state;
   placing a surface of the softened aft facing against a second tool having a shape defining another surface of the panel;
   placing an insulation layer adjacent to the one surface of the base facing;
   vacuum forming the base and aft facings to take the respective shapes of the first and second tools; and
   pressing the base and aft facings together such that they contact each other and fuse along a perimeter to form a panel having an interior volume with the insulation layer and polymer rods inside.

2. The method as recited in claim 1, further comprising applying a foaming film to the one surface of the base facing prior to vacuum forming and then applying heat to the film to cause the film to convert to foam that coats the one surface of the base facing to form the insulation layer.

3. The method as recited in claim 1, wherein the polymer rods are hollow.

4. The method as recited in claim 3, wherein the insulation layer comprises foam that encapsulates the hollow polymer rods.

5. The method as recited in claim 1, wherein the base facing is a composite sheet having a fiber layer encapsulated in a polymer matrix.

6. The method as recited in claim 1, further comprising attaching a decorative film to another surface of the base facing.

7. A method of making a panel:
   placing a surface of a base facing against a first tool having a shape defining one surface of a panel;
   placing a surface of an aft facing against a second tool having a shape defining another surface of the panel;
   vacuum forming the base and aft facings to take the respective shapes of the first and second tools;
   pressing the base and aft facings together such that they contact each other and fuse along a perimeter; and
   attaching an insulation layer to an exterior surface of one of the base and aft facings,
   wherein the insulation layer is attached to the exterior surface of the aft facing using an ultrasonic or laser welding technique.

8. The method as recited in claim 7, wherein the base facing is a composite sheet having a fiber layer encapsulated in a polymer matrix.

9. A method of making a panel:
   placing a surface of a base facing against a first tool having a shape defining one surface of a panel;
   placing a surface of an aft facing against a second tool having a shape defining another surface of the panel;
   vacuum forming the base and aft facings to take the respective shapes of the first and second tools;
   pressing the base and aft facings together such that they contact each other and fuse along a perimeter; and
   attaching an insulation layer to an exterior surface of one of the base and aft facings, wherein the step of attaching the insulation comprises:
positioning a layer of batting material over the exterior surface of the aft facing;
positioning a thin film over the layer of batting material; and
fusing the thin film to the exterior surface of the aft facing.

10. The method as recited in claim 9, wherein the base facing is a composite sheet having a fiber layer encapsulated in a polymer matrix.

\* \* \* \* \*